United States Patent
Tang et al.

(10) Patent No.: US 6,602,933 B2
(45) Date of Patent: Aug. 5, 2003

(54) IN-SITU CO-POLYMERIZATION PROCESS FOR PREPARING IN-ORGANIC FILLER-REINFORCED POLYMER-MATRIX COMPOSITES

(75) Inventors: Chak Yin Tang, Kowloon (HK); Xiao-lin Xie, Wuhan (CN)

(73) Assignee: The Hong Kong Polytechnic University, Kowloon (HK)

( * ) Notice: Subject to any disclaimer, the term of this patent is extended or adjusted under 35 U.S.C. 154(b) by 0 days.

(21) Appl. No.: 09/971,089

(22) Filed: Oct. 5, 2001

(65) Prior Publication Data

US 2003/0100668 A1 May 29, 2003

(51) Int. Cl.[7] .................................................. C08K 9/06
(52) U.S. Cl. ........................ 523/212; 523/200; 523/202; 523/203; 523/205; 523/207; 523/209; 523/210; 523/214; 523/216; 523/217; 524/858; 428/402; 428/403; 428/404; 428/405; 428/406; 428/407
(58) Field of Search ........................... 524/858; 523/200, 523/202, 203, 205, 207, 209, 210, 212, 214, 216, 217; 428/402, 403, 404, 405, 406, 407

(56) References Cited

U.S. PATENT DOCUMENTS

| | | | | | |
|---|---|---|---|---|---|
| 3,519,593 | A | * | 7/1970 | Bolger | 524/452 |
| 4,481,322 | A | * | 11/1984 | Godlewski et al. | 524/265 |
| 4,972,008 | A | * | 11/1990 | Lee et al. | 523/203 |
| 5,278,204 | A | * | 1/1994 | Tojo et al. | 523/212 |
| 5,412,025 | A | * | 5/1995 | Fries | 524/765 |
| 5,871,846 | A | * | 2/1999 | Freeman et al. | 428/405 |
| 6,362,251 | B1 | * | 3/2002 | Alkemper et al. | 523/116 |

OTHER PUBLICATIONS

Hawley, Ed. Excerpt from "The Condensed Chemical Dictionary", 1971, p. 782, 784, 785.*

* cited by examiner

Primary Examiner—Robert Dawson
Assistant Examiner—Jeffrey B. Robertson
(74) Attorney, Agent, or Firm—Leydig, Voit & Mayer, Ltd.

(57) ABSTRACT

In-organic fillers are modified by in-situ co-polymerization of vinyl silane and another vinyl monomer. Vinyl silane couples with the filler by Si—O bonds. The remaining vinyl groups on the surface of the treated fillers then co-polymerize with the other vinyl monomer. The modified in-organic fillers treated by the in-situ co-polymerization are subsequently used to fill the polymer matrix. Tensile and impact strength of filler-reinforced polymer composites are improved remarkably.

1 Claim, 1 Drawing Sheet

Figure 1:
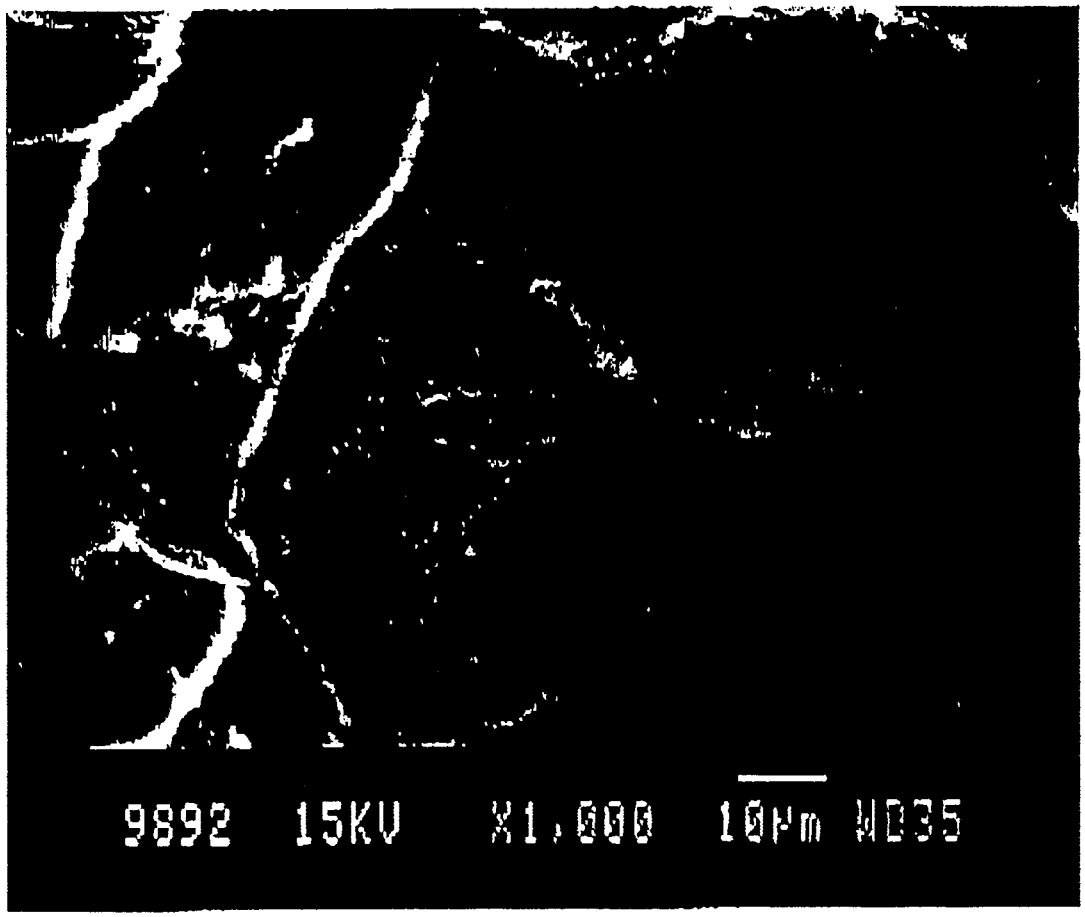

IN-SITU CO-POLYMERIZATION PROCESS FOR PREPARING IN-ORGANIC FILLER-REINFORCED POLYMER-MATRIX COMPOSITES

BACKGROUND OF THE INVENTION

Filler-reinforced polymer composites (FRPC) have been widely used in automobile, household, biomedical and electrical industries due to their enhanced stiffness, hardness, and dimensional stability. However, the tensile and impact strength of these composites is weak, which is attributed to the difference in surface energy between the in-organic fillers and polymer matrix. Therefore, improving the interfacial adhesion between the in-organic fillers and the polymer matrix by modifying the filler surface is desirable.

In order to improve the compatibility between the fillers and the polymer matrix as well as to optimize the mechanical and other physical properties, many attempts have been tried to increase the applicability of FRPCs.

The traditional method to treat filler surface by low molecular coupling agents or surfactants has found to be reasonably effective. However, the low molecular weight compounds hare the tendency to migrate out from the interface to the surface of FRPC, As a consequence, although the stiffness of composite is improved, the tensile and impact strength on the other hand is degraded remarkably. Moreover, undesirable surface appearance due to surface scorching or bulging will be resulted. In order to enhance the stiffness and toughness of FRPC, an elastomer interlayer such as butadiene acrylonitrile copolymer is coated on the filler surface before being incorporated into the polymer matrix. However, the non-homogeneity of filler distribution greatly reduces the toughening effectiveness. Another method for surface modification is by plasma treatment, as described in *International Journal of Adhesion & Adhesives*, Vol. 21, pages 129–136 (2001) and Composites. Part A, Vol 30, pages 405–409(1999), which enables a structural change in the interface so as to increase the compatibility between the fillers and the polymer matrix. However, this method has some limitations in engineering applications.

At present, some new approaches, such as sol-gel processing, in-situ intercalative polymerization, and in-situ polymerization, have been developed for particulate surface treatment to produce high performance FRPC. For the sol-gel processing, as described in *Polymer*, Vol 39, pages 6243–6250 (1998), it provides a good means for the preparation of in-organic metal oxides from organic metal alkoxides, but the formation of a cross-linking network of organic metal oxides makes it difficult to process. As a result, the widespread application of this method is limited. In-situ intercalative polymerization, which has been described in *J. Polym. Sci., Polym. Phys. Edt.*, Vol.36, pages789–795 (1998), is a good method for production of polymer/clay composites or nano-composites, such as PA6/montmorillonite hybrid. However, this method is limited to the preparation of high-performance clay filled polymer composites, which has been described in U.S. Pat. Nos. 5,883,173 and 6,232,388. Recently, another new fabrication method called "in-situ polymerization" has been developed.

In-situ polymerization is a process in which inorganic particles are firstly dispersed into suitable monomers and this mixture is then polymerized using the technique similar to bulk polymerization. By this technique, the high-performance composites can be directly prepared, which has been described in U.S. Pat. Nos. 4,804,427, and 5,770,303. If the technique is used to modify the surface of in-organic filler, the polymer layer coated on the particles reduces particle surface energy as well as promotes the dispersion of the in-organic fillers in the polymer matrix. However, the degree of polymer layer grafting onto the surface fillers is very low, so the effects of reinforcing and toughening of in-organic fillers on the polymer matrix are limited. It has been described in *J. Appl. Polym. Sci.*, Vol. 80, pages 2105–2112 (2001).

OBJECT OF THE INVENTION

It is an object of the present invention to overcome or substantially ameliorate at least one of the above disadvantages.

It is another object of the present invention to provide an in-organic filler modified by in-situ co-polymerization of first and second monomers.

It is a further object of the present invention to take a modified in-organic filler treated by the in-situ co-polymerization and use them to fill a polymer matrix.

It is a general object of the present invention to provide reinforced and toughened composites.

DISCLOSURE OF THE INVENTION

There is disclosed herein an in-organic filler for a polymer matrix modified by in-situ co-polymerization of the first and second monomers. Preferably the first monomer is vinyl siloxane.

Preferably the second monomer is another vinyl monomer.

Preferably the in-organic filler includes but is not limited to talc, mica, calcium carbonate, glass bead, quartz, hydroxypatite and clay.

There is further disclosed herein a method of forming a polymer matrix comprising the steps of modifying an in-organic filler by in-situ co-polymerization of first and second monomers, and filling a polymer matrix with the filler.

Preferably the first monomer is vinyl silane.

Preferably the second monomer is another vinyl monomer.

Preferably the first and second monomers are selected such that the first monomer couples with filler by Si—O bonds and remaining vinyl groups on the surface of the firstly treated filler then co-polymerize with the second monomer.

Preferably the polymer of the second monomer is chosen to be miscible or compatible with the polymer matrix of the composites.

Preferably the first monomer is selected from a silane with a functional vinyl group, including, but not being limited to, tri-ethyloxyl vinyl silane (TEOVS) and tri-methyloxyl vinyl silane (TMOVS).

Preferably the second monomer has functional vinyl group, including but not being limited to methyl methacrylate, butyl methacrylate, styrene and acrylamide.

BRIEF DESCRIPTION OF THE ILLUSTRATION

FIG. 1 depicts a typical SEM photograph of filled polymer-matrix composite made by the invention, which is a glass bead bonded PPO-matrix composite.

DETAILED DESCRIPTION OF THE INVENTION

In this invention, in-organic fillers are modified by in-situ co-polymerization of vinyl silane (first monomer) and another vinyl monomer (second monomer). These two types of monomers are selected by the principle that the first monomer with a functional Si—O bond and a vinyl group (vinyl silane, $CH_2=CH—Si—(OR)_3$, such as tri-ethyloxyl vinyl silane (TEOVS), tri-methyloxyl vinyl silane (TMOVS) and so on) will couple with the filler by Si—O bonds and the remaining vinyl groups on the surface of the firstly treated fillers will then co-polymerize with the second monomer with a functional vinyl group (another vinyl monomer, $CHR_1=CHR_2$, such as methyl methacrylate, butyl methacrylate, styrene, acrylamide, and so on). The polymer of the second monomer is chosen to be miscible or compatible with the polymer matrix of the composites. The modified in-organic fillers treated by the in-situ co-polymerization are subsequently used to fill polymer matrix. It is verified that the modified in-organic filler can both reinforce and toughen the composites.

The first monomer with a functional Si—O bond and a vinyl group (vinyl silane): $CH_2=CH—Si—(OR)_3$, is typically tri-ethyloxyl vinyl silane (TEOVS), tri-methyloxyl vinyl silane (TMOVS) and so on.

The second monomer with functional vinyl group (another vinyl monomer): $CHR_1=CHR_2$, is typically methyl methacrylate, butyl methacrylate, styrene, acrylamide and so on.

The polymer matrix is typically polyethylene, polypropylene, poly (vinyl chloride), polystyrene, poly (phenyl oxide), polyester, polyamide, polycarbonate, etc.

The in-organic fillers are typically talc, mica, calcium carbonate, glass bead, quartz, kaolin, whisker, hydroxyapatite, clay, etc.

The in-situ co-polymerization of the first and second monomers is carried out as follows: the in-organic filler powders are initially treated by a first monomer (vinyl silane)-water solution (the amount of pure vinyl silane is 0.01 to 5% of the filler amount) for 0.5–5 hours at room temperature. It is well known that there are some hydroxyl (—OH) groups on the surface of in-organic fillers. In this process, vinyl silane is coupled with filler by Si—O bonds, and there are many vinyl groups on the surface of the filler, as illustrated below:

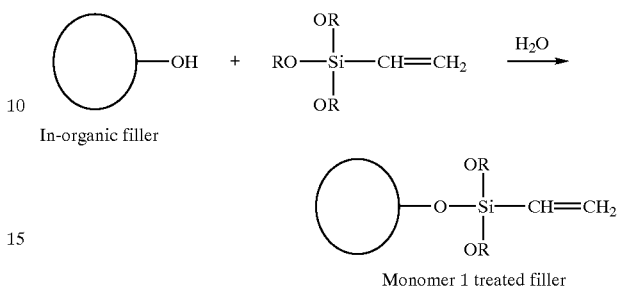

In-organic filler

Monomer 1 treated filler

Then the in-situ co-polymerization of vinyl silane-treated filler with the second monomer (its amount is 0.01~1 phr of the filler amount) is carried out at 30~80° C. by seed emulsion polymerization. The ingredients (deionized water, emulsifier (such as sodium dodecyl sulfonate (SDS)), the second monomer and filler treated by the first monomer) are added to the reactor vessel, with continuous heating and stirring until the reaction temperature reaches the setting temperature. Subsequently, an aqueous solution of a water-soluble initiator (such as ammonium persulfate (APS)), which is preheated to the reaction temperature, is added to start the polymerization reaction. In this process, the conversion of monomers is up to 85~98%, and the grafting ratio of monomers is 5–20%, as illustrated below:

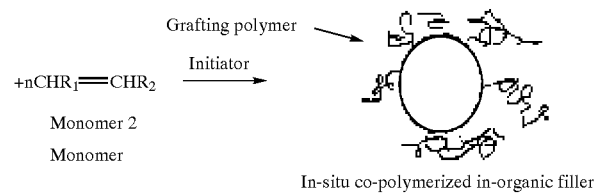

Monomer 1 treated filler

Monomer 2 Monomer

In-situ co-polymerized in-organic filler

Then the in-situ co-polymerization of vinyl siloxane-treated filler with the second monomer (its amount is 0.01~1 phr of the filler amount) is carried out at 30~80° C. by seed emulsion polymerization. The ingredients (deionized water, emulsifier (such as sodium dodecyl sulfonate (SDS)), the second monomer and filler treated by the first monomer) are added to the reactor vessel, with continuous heating and stirring until the reaction temperature reach at the setting temperature. Subsequently, an aqueous solution of a water-soluble initiator (such as ammonium persulfate (APS)), which is preheated to the reaction temperature, is added to start the polymerization reaction. In this process, the conversion of monomers is up to 85~98%, and the grafting ratio of monomers is 5–20%, as illustrated below:

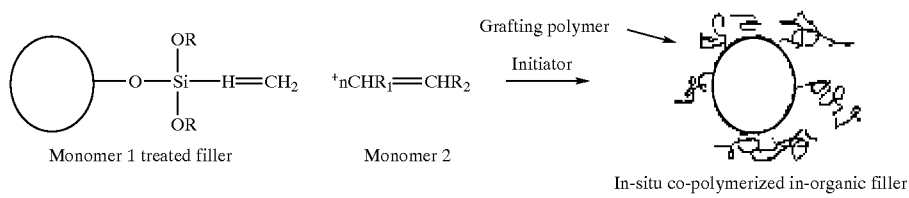

The thermoplastic polymer matrix is subsequently filled with the above modified in-organic filler. Firstly, the polymer matrix pellets and the dried modified in-organic fillers are blended in solid state by a high-speed mixer or in molten state by a screw extruder. The amount of modified in-organic fillers is 5~60%. The composite is prepared by the common molding process, such as injection molding, extrusion and thermal compression molding. Since the polymer grafted on the surface of in-organic filler is miscible or compatible with the polymer matrix, the filler has a good bonding with the polymer matrix (see FIG. 1, ductile fracture of the matrix material rather than debonding of the filler and the matrix). This leads to the high-performance of filled polymer-matrix composites.

EXAMPLE 1

PPO/GB Composite
A. Preparation of Modified Glass Bead

Since polystyrene (PS) is miscible with Poly (phylene oxide) (PPO) matrix, styrene (St) was selected as the second monomer in the in-situ co-polymerization. Tri-ethyloxyl vinyl silane (TEOVS) and styrene (St) were purified by distillation under reduced pressure before use. The particle average size of glass bead (GB) powders was 6000 mesh. Firstly, the GP powders were treated by TEOVS-water solution (the amount of pure TEOVS was 1% of the GB amount) for 2 hours at room temperature. The ingredients [deionized water, sodium dodecyl sulfonate (SDS) as emulsifier, St as the second monomer and the GB powders treated by the first monomer] were added to the reactor vessel, with continuous heating and stirring until the reaction temperature reached at 70° C. Then an aqueous solution of ammonium persulfate (APS), as an initiator (preheated to the reaction temperature) was added to start the polymerization reaction. After 8 hours, the co-polymerization was ended. The modified GB fillers were separated, and dried in vacuum oven. In this process, the conversion of monomers was up to 95%, and the grafting ratio of monomers was 10%.

B. Preparation of PPO/GB Composite

The modified GP was subsequently filled with poly (phenylene oxide) (PPO) matrix. Firstly, the PPO/GB blends containing 15 wt % of GB or treated GB were prepared by a twin screw extruder at 225° C. The extrudates were injection molded by using a injection-molding machine. The injection barrel temperature profile was set to 240, 260 and 260° C. The tensile behavior was determined at room temperature under a cross-head speed of 1 mm/min. Izod impact strength of the composite was measured. Blunt notch with a notch tip radius of 0.25 mm was introduced to the impact specimens with a notch opener. The mechanical properties of PPO/GB composites are listed in Table

TABLE 1

The mechanical properties of PPO/GB composites

| PPO/GB Composite | Tensile modulus GPa | Tensile strength MPa | Izod impact strength kJ/cm$^2$ |
|---|---|---|---|
| 6000 mesh GB, no treatment | 2.11 | 48.0 | 6.5 |
| 6000 mesh GB treated by in-situ co-polymerization | 2.24 | 52.0 | 12.3 |

From Table 1, it can be seen that Young's modulus and the tensile strength of the composites are higher than those of the untreated GB filled PPO-matrix composite. Particularly, the impact strength of the untreated GB filled PPO-matrix composite is 6.5 kJm$^{-2}$, however, the impact strength of the composites increased to 12.3 kJm$^{-2}$ when the glass beads were treated by the TEOVS/St in-situ co-polymerization. Since the surface of glass bead was covered by in-situ grafting-polymerized PSt, the PSt enhanced the interaction between the glass bead and PPO, and improved the interfacial adhesion. This led to the increasing in Young's modulus and the tensile strength of the PSt-grafted-glass bead/PPO composites. Moreover, the improved interfacial adhesion was favorable to transmit the impact force and to absorb the fracture energy, it led to toughening of GB to PPO/GB composites.

EXAMPLE 2

PVC/talc Composite
A. Preparation of Modified Talc

Since poly(methyl methacrylate) (PMMA) is miscible with PVC matrix, methyl methacrylate (MMA) was selected as the second monomer in the in-situ co-polymerization. Tri-methyloxyl vinyl silane (TMOVS) and methyl methacrylate (MMA) were purified by distillation under reduced pressure before use. The particle average size of talc powders was 2500 mesh. Firstly, the talc powders were treated by TMOVS-water solution (the amount of pure TMOVS was 1% of the talc amount) for 2 hours at room temperature. The ingredients [deionized water, sodium dodecyl sulfonate (SDS) as emulsifier, MMA as the second monomer and the talc powders treated by the first monomer] were added to the reactor vessel, with continuous heating and stirring until the reaction temperature reached at 70° C. Then an aqueous solution of ammonium persulfate (APS), as an initiator (preheated to the reaction temperature) was added to start the polymerization reaction. After 8 hours, the co-polymerization was ended. The modiFied talc fillers were separated, and dried in vacuum oven. In this process, the conversion of monomers was up to 98%, and the grafting ratio of monomers was 12%.

B. Preparation of PVC/talc Composite

The modified talc was subsequently filled with poly (vinyl chloride) (PVC) matrix. The PVC matrix had the following composition: 100 parts PVC, 3 parts heat stabilizer (XP-301), 1 part process aid (ACR-401), 0.6 parts paraffin wax (intermediate lubricant), and 0.5 parts stearic acid. PMMA-grafted-talc and untreated talc were mixed with the PVC matrix mixture in a high-speed mixer. The talc weight fraction was kept at 30% for all the composites. The composite mixtures were plasticized by a two-roll-mill at 180° C. for 10 minutes. Composite plates were compression-molded at 180° C. for 8 minutes, with a 5-minutes preheating period. Care was taken at this stage to ensure precise timing so as to eliminate any differences that might arise as a result of the samples having different thermal histories. These plates were cut into dog-bone shaped tensile bars. Notched Izod impact specimens were also prepared from the plates. The tensile behavior was determined at room temperature under a cross-head speed of 1 mm/min. Izod impact specimens were tested by a impact tester. Blunt notch with a notch tip radius of 0.25 mm was introduced to the impact specimens with a notch opener. The mechanical properties of PVC/talc composites are listed in Table 2.

TABLE 2

The mechanical properties of PVC/talc composites

| PVC/talc Composite | Tensile modulus GPa | Tensile strength MPa | Izod impact strength kJ/cm$^2$ |
|---|---|---|---|
| 2500 mesh talc, no treatment | 1.35 | 45.0 | 4.1 |
| 2500 mesh talc treated by in-situ co-polymerization | 1.53 | 51.2 | 6.3 |

Table 2 indicates that the talc modified by in-situ co-polymerization of TMOVS and styrene can reinforce and toughen the PVC/talc composites at the same time.

EXAMPLE 3

PP/talc Composite

A. Preparation of Modified Talc

Since poly(butyl acrylate) (PBA) is compatible with Polypropylene (PP) matrix, butyl acrylate (BA) was selected as the second monomer in the in-situ co-polymerization. Tri-methyloxyl vinyl silane (TMOVS) and BA were purified by distillation under reduced pressure before use. The particle average size of talc powders was 2500 mesh. Firstly, the talc powders were treated by TMOVS-water solution (the amount of pure TMOVS was 1% of the talc amount) for 2 hours at room temperature. The ingredients [deionized water, sodium dodecyl sulfonate (SDS) as emulsifier, BA as the second monomer (BA) and the talc powders treated by the first monomer] were added to the reactor vessel, with continuous heating and stirring until the reaction temperature reached at 70° C. Then an aqueous solution of ammonium persulfate (APS), as an initiator (preheated to the reaction temperature) was added to start the polymerization reaction. After a hours, the co-polymerization was ended. The modified talc fillers were separated, and dried in vacuum oven. In this process, the conversion of monomers was up to 98%, and the grafting ratio of monomers was 16%.

B. Preparation of PP/talc Composite

The modified talc was subsequently filled with polypropylene (PP) matrix. Firstly, The PP/talc blends containing 30 wt % of talc or treated talc were prepared in a twin screw extruder at 180° C. The extrudates were injection molded by using a injection-molding machine. The injection barrel temperature profile was set on 170, 180 and 180° C. The tensile behavior was determined at room temperature under a cross-head speed of 1 mm/min. Izod impact strength of the composite was tested by a impact tester. Blunt notch with a notch tip radius of 0.25 mm was introduced to the impact specimens with a notch opener.

The mechanical properties of PP/talc composites are listed in Table 3.

TABLE 3

The mechanical properties of PP/talc composites

| PP/talc Composite | Tensile modulus GPa | Tensile strength MPa | Izod impact strength kJ/cm$^2$ |
|---|---|---|---|
| 2500 mesh talc, no treatment | 1.24 | 250.2 | 4.2 |
| 2500 mesh talc treated by in-situ co-polymerization | 1.58 | 32.5 | 6.5 |

Table 3 indicates that the talc modified by in-situ co-polymerization of TMOVS and butyl acrylate (BA) can reinforce and toughen the PP/talc composites.

What is claimed is:

1. A method of forming a polymer-matrix composite comprising:

modifying an in-organic filler by in-situ co-polymerization of first and second monomers; and filling a polymer matrix with the filler wherein the first monomer is an organic silane with a functional vinyl group selected from the group consisting of tri-ethyloxyl vinyl silane and tri-methyloxyl vinyl silane, and the second monomer has a functional vinyl group selected from the group consisting of methyl methacrylate, butyl methacrylate, styrene, and acrylamide.

* * * * *